Jan. 26, 1937.  F. HAMILTON  2,068,950
OPTICAL EDUCATIONAL DEVICE
Filed Feb. 28, 1935
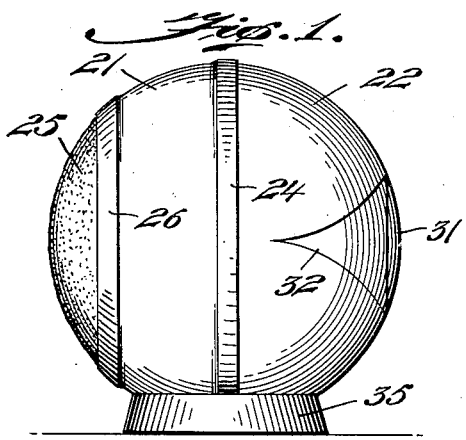
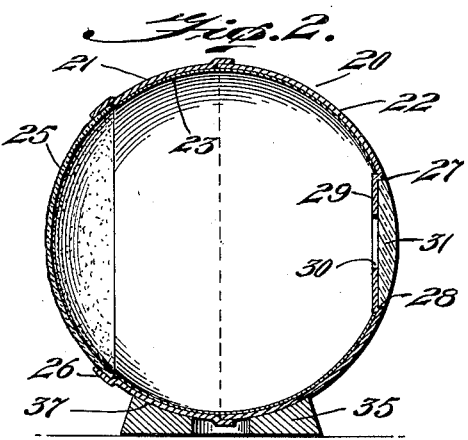
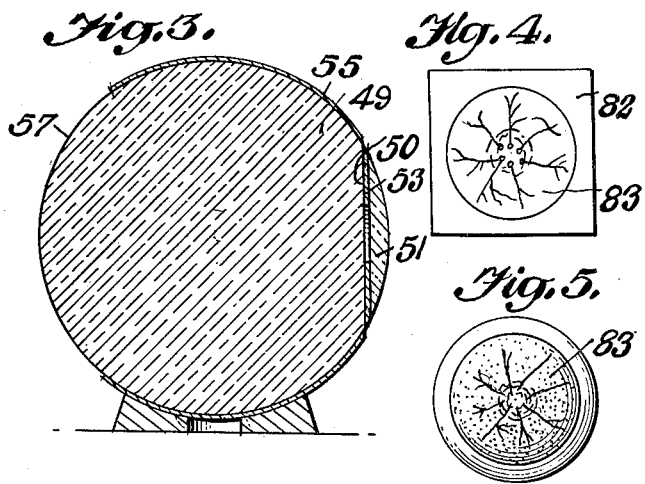
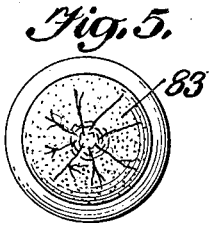
Inventor
Frederick Hamilton
By Horatio E. Bellows
Attorney Patented Jan. 26, 1937

2,068,950

UNITED STATES PATENT OFFICE 2,068,950

OPTICAL EDUCATIONAL DEVICE

Frederick Hamilton, Glocester, R. I.

Application February 28, 1935, Serial No. 8,607

7 Claims. (Cl. 35—17)

My invention relates to an optical educational device or appliance for producing and exposing objective images.

Objects of my invention are to disclose in an inanimate structure parts of the eye employed in the function of seeing, including certain parts visually inaccessible; to enable in such structure the display of a curved image identical with an image projected upon the curved retina of the human eye in distinction from the flat image projected upon the flat surface of a camera screen; and to render such display visible or accessible from points exterior of said structure, whereby the visual specialist or the illuminating engineer may observe, interpret, and demonstrate such facts in the visual and illuminating fields respectively, as are disclosed in the displayed image.

Further objects of this invention are to test lighting devices, and to afford a mechanical means for displaying the proportion of light or shadow in any area within the field to which my device is directed, whereby an unbalanced illuminating condition may be noted.

A still further object is to enable the production of moving pictures upon the image arresting portion of the device by manually transversely moving the appliance relatively to the objects toward which the image admitting portion is directed.

Additional objects are facility of operation and simplicity and inexpensiveness of construction, and the accurate reproduction of eye vision.

With the above and other advantageous features and objects in view, my invention consists in the novel construction and arrangement of parts more fully disclosed in the detailed description following, in conjunction with the accompanying drawing, and more specifically defined in the appended claims.

In the drawing,

Figures 1 and 2 are a side elevation and a vertical longitudinal section respectively of my novel device, Figure 3, a vertical central section of a modified form of my device, Figure 4, a front view of a chart, and Figure 5, a rear view of my device, omitting the standard, showing a projection of the chart thereon.

My appliance consists of a substantially spherical body 20 comprising one or more, in this instance two, transversely curved annular vertically disposed rings or sections 21 and 22 of opaque material such as celluloid, constituting the intermediate shell portion of the body. If the material of the rings is white it is advisable to apply to the interior surface a coating 23 of black paint. The ring 21 abuts against the ring 22, and an offset flange 24 on the former overlaps the latter and is secured thereto by an adhesive. The rear portion of the body includes a circular transversely convex translucent screen 25 of ground glass, frosted glass, or the like, whose edge abuts that of the ring 21 and is marginally overlapped by an offset annular flange 26 upon the latter. This interengagement may be augmented if desired by an adhesive.

Diametrically opposite the screen 25, the forward edge of the ring 22 forms an orifice 27 of less diameter than that of the screen 25 in which snugly fits a forwardly directed annular shoulder 28 upon the periphery of a thin disk or diaphragm 29 of opaque material provided with a central aperture 30. The members 28, 29 may be integral with the ring 22. Fixed by an adhesive to the front of the annular disk 29 is a lens 31 whose convex face is symmetrical with the remainder of the surface of the body 20. Upon the face of ring 22 at each side of the lens 31 the angular presentations of the white of the eye 32 is produced by paint.

A frusto conical support 35 has in its upper portion a curved depression 37 in which an intermediate portion of the body 20 rests, or in which the body is fixed by an adhesive, according to whether the support is desired merely as a rest or as a handle.

It will be noted that the described body 20 is analogous to and resembles in appearance an eyeball and several of its parts. The lens 31, disk 29, aperture 30, and screen 25 suggest the cornea, iris, pupil, and retina respectively.

The form of the invention shown in Figure 3 discloses a substantially spherical body, the major section 49 of which is of solid glass and a nearly complete sphere, except that its forward portion has a vertically disposed plane face 50. A second glass section 51, of segmental shape, completes the spherical outline of the body after it is applied to the section 49 and constitutes a lens. An annular disk 53 of opaque material is interposed between the two sections and fixed to both by cement or other adhesive. An opaque covering, such as a coating 55 of paint, extends from the disk to a semispherical translucent screen 57 of frosted or ground glass diametrically opposite the circular open center of the disk 53.

In using my device the body, either with or without the support is manually grasped and the forward portion is directed towards the object, objects, or landscape, to be inspected. The device is focused upon the object, and the rays of light reflected therefrom pass through the lens and aperture of the disk projecting the image thereof through the screen, and is visible upon the exterior convex surface of the latter, the rays being protected by the opaque area of the body. The passage of the image through the translucent screen slightly but not seriously lessens the sharpness of the lines of the image, and the vividness of its coloring, but emphasizes the light and shadow contrasts of the object. The use of my device upon articles, and room interiors, therefore, assists illuminating engineers and decorators.

The translucent character of the screen prevents the free escape of the light therethrough and thus retains the image thereon. This image, however, unlike that of the photographic camera plate, is not permanent, and when there is any movement of my device relatively to the object, a moving picture is presented upon the screen. The image disclosed by the curved screen of my device is a reproduction of eye vision, and therefore presents the image more distinct at the visual axis than in the secondary axis or indirect field, in distinction from the camera plate which gives perfect detail in its entire range.

A flat card 82, shown in Figure 4, is provided centrally of its face with a circular representation 83 of the background of the human eye, including the head of the optic nerve and the blood vessels, arteries, and veins which radiate from the head over a part of the retinal background. By focusing my device upon the card 82 the convex image 83 will be displayed as shown in Figure 5.

The visual specialist or optician is thus enabled to impart to the student or customer, in natural and accurate anatomical relation, those constituent and related parts of the background of the eye that have heretofore been inadequately represented by plane surfaces.

The illuminating engineer when testing the distribution of light in a room positions the device in a portion of the room opposite the fireplace, window, or other primary source of light, with the lens directed to such source. The image of the room produced upon the screen is then studied to note what portions of the room are relatively too dark and to what extent in order to determine the location of any auxiliary or artificial light.

I claim:—

1. In an optical device for producing and displaying objective images, a superficially curved body including a lens portion, a convex translucent screen portion diametrically opposite the lens portion, and an intermediate portion supporting the lens portion and the screen portion, the periphery of the intermediate portion being opaque.

2. In an optical device for producing and displaying objective images, a superficially curved body including a lens portion, a convex translucent screen portion disposed diametrically opposite to the lens portion, and an intermediate portion attached at one end to the screen portion and at its opposite end to the lens portion, the exposed surface of the intermediate portion between its ends being opaque, and a support upon which the intermediate portions of the body is superposed.

3. In an optical device for producing and displaying objective images, a superficially curved body including an intermediate portion, a lens portion, an annular opaque disk interposed between the lens portion and the intermediate portion, and a convex translucent screen portion diametrically opposite the lens portion, the exposed surface of the intermediate portion being opaque.

4. In an optical device for producing and displaying objective images, a superficially curved body including an intermediate opaque annular shell portion, a convex translucent screen portion upon one end of the shell portion, and a lens carried by the other end of the shell portion diametrically opposite the screen portion.

5. In an optical device for producing and displaying objective images, a substantially spherical body including an intermediate annular shell portion, a convex translucent screen portion attached to one end of the shell portion, an annular opaque disk fixed to the other end of the shell portion, and a lens fixed to the disk.

6. In an optical device for producing and displaying objective images, a globular body having a lens adjacent the periphery at one portion thereof, an apertured opaque disc contiguous to the lens and a translucent image receiving screen on the outer surface of a second portion which is positioned diametrically with relation to the lens and the disc aperture.

7. In an optical device for producing and displaying objective images, a globular glass body having a solid transparent intermediate portion, a plane face at one end thereof, and a translucent surface portion diametrically opposite said plane face, an opaque disc mounted on said plane face and having a central aperture, and a lens mounted on said disc in alignment with said aperture.

FREDERICK HAMILTON.